United States Patent [19]
Hoffmann

[11] 3,935,780
[45] Feb. 3, 1976

[54] BAND SAW DRIVE ARRANGEMENT

[76] Inventor: John A. Hoffmann, Lake Lynwood, Lynn Center, Ill. 61262

[22] Filed: Feb. 24, 1975

[21] Appl. No.: 552,449

[52] U.S. Cl. .................................. 83/820; 83/788
[51] Int. Cl.² ...................... B26D 1/46; B26D 1/54
[58] Field of Search ............ 83/820, 788, 814, 809, 83/112

[56] References Cited
UNITED STATES PATENTS

| 8,056 | 4/1851 | Hedge | 83/112 |
|---|---|---|---|
| 81,434 | 8/1868 | Thompson | 83/809 |
| 2,954,061 | 9/1960 | Stordal | 83/820 X |

FOREIGN PATENTS OR APPLICATIONS

| 1,403,199 | 5/1965 | France | 83/820 |

Primary Examiner—Willie G. Abercrombie
Attorney, Agent, or Firm—R. L. Hollister

[57] ABSTRACT

A band saw drive arrangement including relatively large driven and idler pulleys and a relatively small drive pulley. The pulleys are all V-grooved pulleys and are mounted in coplanar relationship for rotation about spaced, parallel axes, with the drive pulley positioned between the driven and idler pulleys. The drive pulley is motor driven and an endless flexible V-belt is trained about the drive and driven pulleys. A V-belt is also secured in the groove of the idler pulley. An endless flexible saw band is trained about the driven and idler pulleys with its inner surface in frictional driving engagement with the outer surfaces of the V-belts. The maximum and minimum widths of the V-belts are less and greater than, respectively, the maximum and minimum widths of the V-grooves provided in the driven and idler pulleys with which they are associated so that the outer surfaces of the U-belts are recessed within the driven and idler pulley V-grooves and the outer portions of the sides of the grooves provide guide surfaces which prevent unintentional removal of the saw band.

7 Claims, 2 Drawing Figures

BAND SAW DRIVE ARRANGEMENT

BACKGROUND OF THE INVENTION

The present invention relates generally to band saws and more specifically relates to a novel drive arrangement for an endless flexible saw band.

Band saws of the type with which the present invention is concerned include an endless flexible saw band trained about at least a pair of pulleys or wheels mounted for rotation on spaced parallel axes. One of the pulleys about which the saw band is trained is power driven and drives the band by frictional engagement between the periphery of the wheel and the inner surface of the band. The frictional engagement is either the metal saw band to the metal periphery of the pulley or the pulley is provided with a rubber tread on its periphery. In the typical band saw the power is supplied to the driven pulley by an electric motor or other suitable prime mover through a series of pulleys and at least one belt. Because the saw band is running on the periphery of the driven pulley, an extra pulley, mounted on a shaft common to the driven pulley or integral with the driven pulley, was employed to receive the belt from the motor pulley.

SUMMARY OF THE INVENTION

The principle object of the present invention is to provide a simplified band saw drive arrangement.

Another object of the present invention is to provide a band saw drive arrangement in which a drive belt is trained about one of the pulleys about which the saw band is trained.

A more specific object of the invention is to provide a band saw drive arrangement in which the saw band rides on a drive belt and is driven thereby.

Still a more specific object of the invention is to provide a band saw including driven and idler pulleys mounted for rotation about spaced parallel axes, a drive pulley mounted between the driven and idler pulleys for rotation about a third axis parallel to and spaced from the first mentioned axes, an endless flexible belt trained about the drive and driven pulleys to transmit rotation from one to the other, and an endless flexible saw band trained about the driven and idler pulleys with its inner surface in frictional driving engagement with the outer surface of the drive belt.

Yet another object of the invention is to provide a band saw as set forth in the preceding object wherein at least the driven pulley is a V-grooved pulley and the outer portions of the sides of the V-groove serve as guides for the saw band to prevent unintentional removal.

The above and additional objects and advantages of the present invention will be apparent to those skilled in the art from a reading of the following detailed description of a preferred embodiment when taken in conjunction with the accompanying drawing.

DESCRIPTION OF THE PREFERRED EMBODIMENT

Figure 2:
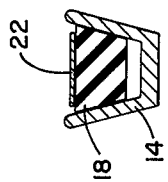
FIG. 2 is a sectional view taken substantially along the lines 2—2 of FIG. 1.
Figure 1:
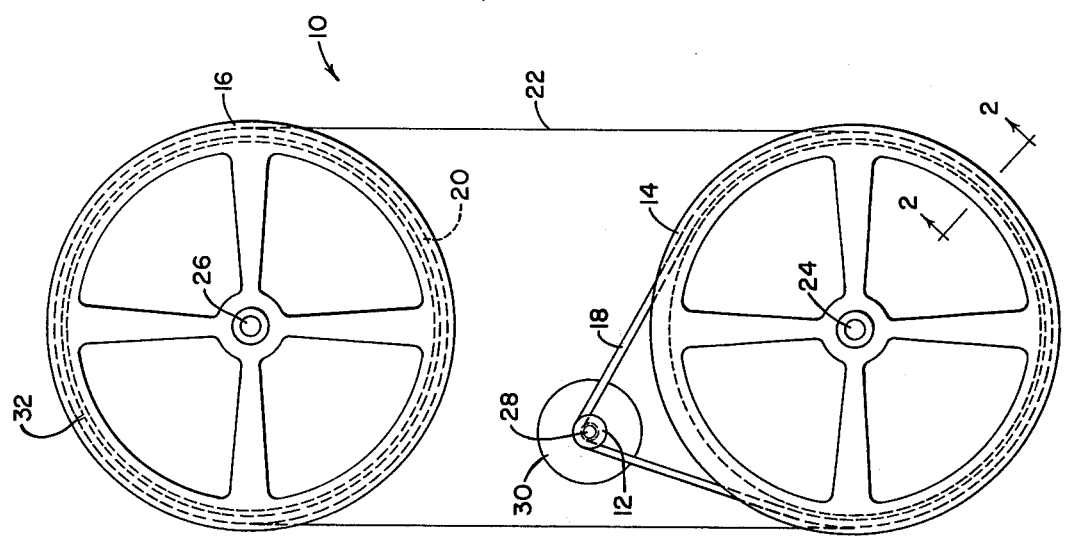
FIG. 1 is a side elevational view of a band saw drive arrangement constructed in accordance with the principles of the present invention.

Referring to the drawing, a band saw drive arrangement is indicated in its entirety by the numeral 10 and includes a drive pulley 12, a driven pulley 14, an idler pulley 16, a drive belt 18, a flexible pulley tread 20, and a saw band 22. The driven and idler pulleys 14 and 16 are of relatively large size so that they will induce very little flexing in the band 22 and are mounted for rotation about spaced parallel axes represented by the shafts 24 and 26. The driven and idler pulleys can either be rotatable on the shafts 24 and 26, respectively, or can be fixed to the shafts and the shafts be rotatable. Also, in order to maintain the band 22 reasonably taut, as will be more fully explained hereinafter, the shaft 26 for the idler pulley 16 is adjustably mounted and yieldably biased away from the shaft 24 for the driven pulley 14. Specific features of the mounting of the driven and idler pulleys do not form a part of the present invention so are not illustrated and described in detail.

The drive pulley 12 is positioned between and coplanar to the pulleys 14 and 16 and is mounted on the drive shaft 28 of a motor 30, the shaft 28 being parallel to and spaced from the shafts 24 and 26. For reasons to be made apparent hereinafter, the motor 30 is also adjustably mounted so the distance between its shaft 28 and the shaft 24 for the driven pulley can be varied.

The pulleys 12, 14 and 16 are all V-grooved pulleys, and the drive belt 18 is a V-belt trained about the drive pulley 12 and driven pulley 14. The mounting of the motor 30 is adjusted to keep the V-belt 18 reasonably taut so the tapering sides thereof have a good frictional engagement with the tapering sides of the V-grooves provided in the pulleys 12 and 14.

As can be seen in FIG. 2, the V-belt 18 is slightly undersized with respect to the V-grooved pulley 14 so the outer surface of the V-belt 18 is recessed within the periphery of the V-grooved pulley. That is, although the V-belt and V-groove have correspondingly tapering sides, the V-groove has a depth greater than the thickness of the V-belt and the maximum and minimum widths of the V-belt 18 are less and greater than, respectively, the maximum and minimum widths of the pulley groove so that the belt is positioned completely within the grooves before the tapering sides of the belt frictionally engage the sides of the pulley groove.

The idler pulley 16 is similar in construction to the driven pulley 14, and the flexible pulley tread 20 is positioned within the V-groove provided in its periphery. The pulley tread 20 is preferably a section of a V-belt similar in construction to the V-belt 18 so that it fits within the groove provided in the pulley 16 in the same manner the V-belt 18 fits within the groove provided in the pulley 14. The ends of the pulley tread 20 are brought together as at 32 and joined in any suitable manner such as by adhesive.

The endless flexible saw band 22 is trained about the driven and idler pulleys 14 and 16 so that it rides in the grooves of the pulleys with its inner surface in frictional driving engagement with the outer surfaces of the V-belt 18 and pulley tread 20. The adjustable mounting of the idler pulley with the yieldable bias automatically maintains the tension required in the band for good frictional engagement between the band and V-belt and for maintaining the band straight when in engagement with a workpiece.

The V-belt 18 and the pulley tread 20 not only provide good frictional surfaces on which the band 22 runs, but also provide semi-resilient surfaces which permit the teeth of the saw band to sink slightly and prevent damage thereto.

By having the drive pulley 12 positioned between the driven and idler pulleys 14 and 16, the reach of the V-belt between the drive pulley and driven pulley in no way interfers with the saw band since the only contact between the two is in the area of the periphery of the driven pulley opposite from the drive pulley. Also, since the V-belt 18 and pulley tread 20 are recessed within the pulley grooves, the band 22 is also positioned within the pulley grooves so the outer portions of the sides of the pulley grooves serve as guides or retainers which prevent unintentional removal of the saw band.

It can be seen from the foregoing that the present invention provides a simplified band saw drive arrangement in which a minimum number of pulleys and belts are utilized, in which the saw band rides on and is driven by the drive or power belt, and in which the pulleys provide guides to prevent unintentional removal of the saw band.

Having thus described a single preferred embodiment of the invention, various modifications within the spirit and scope of the invention will become apparent to those skilled in the art and such modifications can be incorporated into the invention without departing from the underlying principles thereof. Therefore, the invention should not be limited to the specific illustration and description of the single preferred embodiment, but only by the following claims.

I claim:

1. In a band saw, the combination comprising: an idler pulley mounted for rotation about a first axis; a driven pulley mounted coplanar to the idler pulley for rotation about an axis spaced from and parallel to the first axis; a drive pulley having a diameter less than the diameter of each of the idler and driven pulleys mounted between and coplanar with the idler and driven pulleys for rotation about a third axis parallel to the first and second axes; means for driving the drive pulley; an endless flexible belt trained about and extending directly between the drive and driven pulleys; and an endless flexible saw band trained about and extending directly between the driven and idler pulleys with the inner surface of the portion of the endless saw band extending about the driven pulley in frictional drive engagement with the outer surface of the endless flexible belt.

2. The invention as set forth in claim 1 wherein at least the drive and driven pulleys are grooved pulleys and the groove of the driven pulley has a depth greater than the maximum thickness of the endless flexible belt whereby the sides of the groove in the driven pulley also serve as guides for the endless flexible saw band.

3. In a band saw, the combination comprising: an idler pulley mounted for rotation about a first axis; a driven pulley mounted coplanar to the first pulley for rotation about an axis spaced from and parallel to the first axis; a drive pulley mounted between the idler and driven pulleys coplanar therewith for rotation about a third axis parallel to the first and second axes; means for driving the drive pulley; at least the drive and driven pulleys being V-grooved pulleys; an endless flexible V-belt trained about the drive and driven pulleys; and an endless flexible saw band trained about the driven and idler pulleys with that portion of the inner surface thereof trained about the driven pulley in frictional driving engagement with the outer surface of the V-belt; the sides of the V-groove provided in the driven pulley and the sides of the V-belt having substantially corresponding tapers with the maximum and minimum distances between the sides of the V-groove provided in the driven pulley being greater and less than, respectively, the maximum and minimum widths of the V-belt whereby the V-belt is recessed within the V-groove provided in the driven pulley and the outer portions of the sides of the V-groove provided in the driven pulley serve as flanges to prevent unintentional removal of the saw band from the driven pulley.

4. The invention as set forth in claim 3 wherein the endless flexible saw band has a maximum width less than the maximum width of the endless flexible V-belt.

5. The invention as set forth in claim 3 wherein the idler pulley is provided with a circumferential groove, a flexible material covers the bottom of the groove, and the inner surface of that portion of the endless flexible saw band trained about the idler pulley engages the flexible material.

6. The invention as set forth in claim 5 wherein the groove provided in the idler pulley is a V-groove, the flexible material is in the form of a V-belt positioned and secured in the idler pulley groove with its outer surface recessed within the groove, whereby the outer portions of the sides of the V-groove provided in the idler pulley serve as flanges to prevent unintentional removal of the saw band from the idler pulley.

7. The invention as set forth in claim 6 wherein the endless flexible V-belt trained about the driven pulley and the V-belt positioned in the groove provided in the idler pulley each has a maximum width greater than the width of the endless flexible saw band.

* * * * *